United States Patent
Moradi et al.

[11] Patent Number: 5,922,952
[45] Date of Patent: *Jul. 13, 1999

[54] DRIVELINE SYSTEM BALANCING METHOD AND APPARATUS

[75] Inventors: Mohammad Ali Moradi, W. Bloomfield; Robert J. Higley, Ann Arbor; Michael Dennis Rossman, Canton, all of Mich.

[73] Assignee: Ford Global Technologies, Inc., Dearborn, Mich.

[*] Notice: This patent is subject to a terminal disclaimer.

[21] Appl. No.: 08/990,675

[22] Filed: Dec. 15, 1997

[51] Int. Cl.⁶ .................................................. G01M 1/22
[52] U.S. Cl. ............................................. 73/462; 73/475
[58] Field of Search ......................... 73/460, 462, 468, 73/471, 473, 475, 476, 457, 458; 464/180

[56] References Cited

U.S. PATENT DOCUMENTS

| | | | |
|---|---|---|---|
| 3,712,127 | 1/1973 | Petersen | 73/118 |
| 3,848,694 | 11/1974 | Matsui et al. | 248/18 |
| 3,887,024 | 6/1975 | Takahashi et al. | 180/70 P |
| 4,170,896 | 10/1979 | Korkosz | 73/462 |
| 4,236,407 | 12/1980 | Alpini et al. | 73/118 |
| 4,653,324 | 3/1987 | Nugier | 73/460 |
| 4,669,571 | 6/1987 | Kurde | 180/73.3 |
| 4,898,026 | 2/1990 | Damitz | 73/118.1 |
| 4,939,985 | 7/1990 | Von Thun | 73/118.1 |
| 5,199,526 | 4/1993 | Derviller | 180/297 |
| 5,419,192 | 5/1995 | Maxwell et al. | 73/462 |
| 5,431,049 | 7/1995 | Kopp | 73/457 |
| 5,641,904 | 6/1997 | Kopp et al. | 73/457 |
| 5,760,302 | 6/1998 | Moradi et al. | 73/475 |
| 5,767,403 | 6/1998 | Moradi et al. | 73/468 |

OTHER PUBLICATIONS

Publication "Automotive technology: a systems approach", Jack Erjavec et al, 1992, pp. 697–699.

*Primary Examiner*—Hezron Williams
*Assistant Examiner*—Helen C. Kwok
*Attorney, Agent, or Firm*—James J. Dottavio

[57] ABSTRACT

An apparatus and method for balancing a combined assembly of a driveshaft and axle. The apparatus includes a fixture for supporting the driveshaft and axle assembly in vehicle position. The rear axle is supported using the attachments where the axle is mounted to the motor vehicle. The assembly is rotated and a sensor detects vibrations. An imbalance calculator determines a weight to be added to the driveline to correct the imbalance.

12 Claims, 3 Drawing Sheets

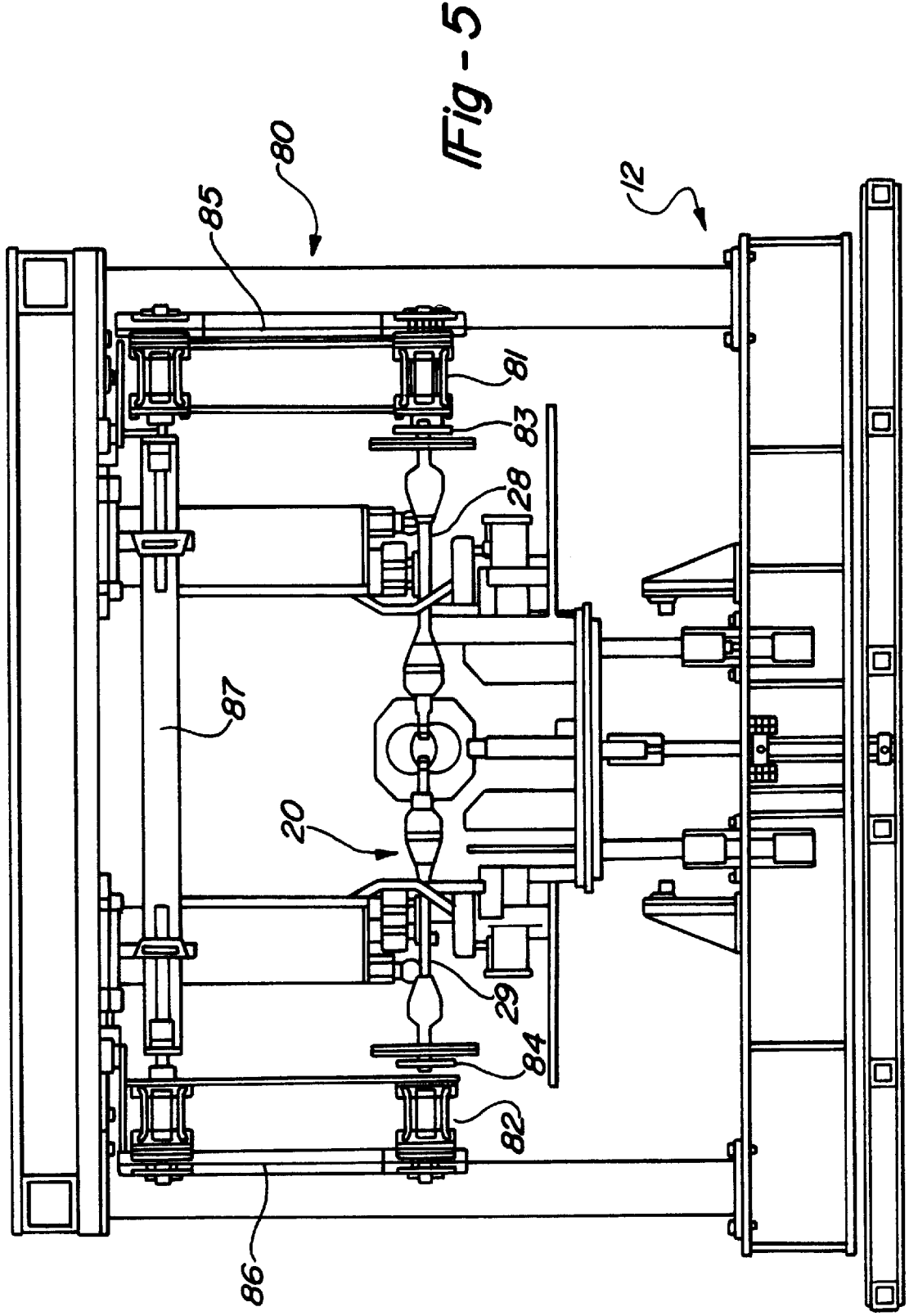

DRIVELINE SYSTEM BALANCING METHOD AND APPARATUS

BACKGROUND OF THE INVENTION

1. Field of the Invention

This invention relates to a method and apparatus for balancing an automotive driveline system.

2. Prior Art

In a rear wheel drive motor vehicle, the driveline comprises a transmission connected to a driveshaft which is then connected to a rear differential assembly which drives a rear drive axle. In most vehicles, the individual driveline components are balanced to provide a minimal vibration due to component imbalance. However, residual imbalances remain in the components and these imbalances may accumulate to provide an unacceptable driveline assembly.

To correct such imbalance, some vehicle manufacturers assemble the vehicle completely, then drive each assembled vehicle on a road course to establish whether the driveline imbalance of that particular vehicle is acceptable. Any perceived excessive imbalance is then corrected by diagnosing the imbalance and adding weights to the driveline at the appropriate location. Methods to balance the driveline include unbolting the driveline and reassembling the driveline with heavier fasteners to correct the imbalance, or by adding weights to the driveshaft by welding or otherwise securing a weight. These methods require excessive diagnostic time and do not capture imbalances which are marginally objectionable to some drivers, plus requires disassembly of the vehicle.

U.S. Pat. No. 5,419,192, to Maxwell et al, describes an apparatus for balancing a combined assembly of a driveshaft and axle input shaft. A system described in Maxwell is particularly for balancing a solid rear axle. The '192 device supports the differential, as shown in FIG. 4 of the '192 patent, using a first head 70 to support the front of the differential. FIG. 5 of the '192 patent shows further support for the axle, including a cradle 63 and a pair of support arms 65 and 66, as described in column 6, lines 18–69. Such mounting of the rear axle does not simulate the mounting experienced in the motor vehicle, because the cradle 63 and first head 70 do not relate to any attachment supporting the axle in the motor vehicle and therefore the fixture does not accurately simulate the driveline dynamics in the vehicle. Furthermore, the sensor 78 used in Maxwell ('192) is mounted, as shown in FIG. 6 of Maxwell, to the bracket 73 which supports the front of the differential and the center bearing. By so positioning the sensor and so supporting the driveline assembly, the true vibrations experienced by the driveline of the motor vehicle are not accurately measured, nor are the vibrations of the driveline as experienced by the body measured. The vibration of the fixture is measured.

It is therefore desirable to provide a method and fixture to mount a driveline assembly simulating the environment in a motor vehicle and directly measuring the vibrations produced in the driveline assembly which are experienced by the vehicle body.

SUMMARY OF THE INVENTION

It is an object of the present invention to provide a method and apparatus for mounting the driveline of a motor vehicle and directly measuring the vibration produced thereby as experienced by the body of the vehicle.

In accordance with the above object, an apparatus and method are described for balancing a combined assembly of a driveshaft and axle. The apparatus includes a fixture for supporting the driveshaft and axle assembly in vehicle position. The rear axle is supported using the attachments where the axle is mounted to the motor vehicle. The assembly is rotated and a sensor detects vibrations. An imbalance calculator determines a weight to be added to the driveline to correct the imbalance.

The above object and other objects and features of the invention will be readily appreciated by one of ordinary skill in the art from the following detailed description of the best mode for carrying out the invention when taken in connection with the following drawings.

BRIEF DESCRIPTION OF THE DRAWINGS

FIG. 5 is a front elevation of a fixture according to the present invention.

DETAILED DESCRIPTION OF THE PREFERRED EMBODIMENTS

Figure 1:
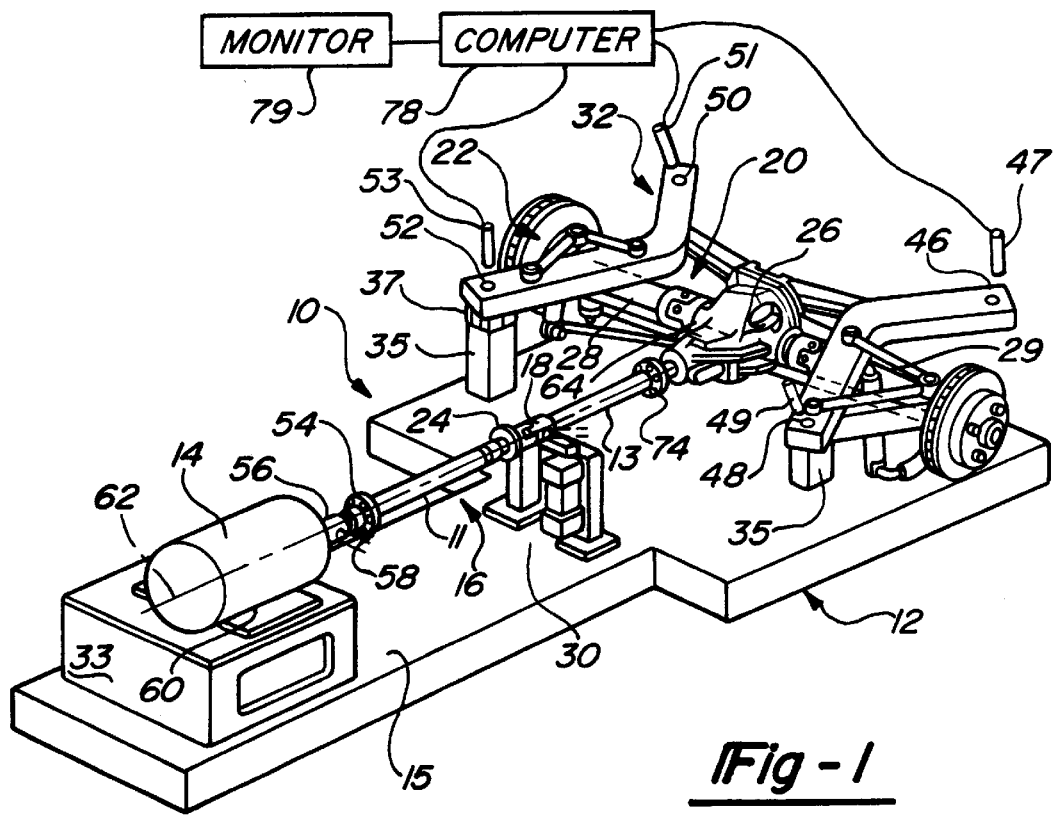
FIG. 1 is a perspective view of a driveline mounted in a fixture according to the present invention.

Referring to FIG. 1, a driveline 10 is mounted in a fixture 12 according to the present invention. The fixture 12 provides a motor 14 for driving the driveline 10 and mounting supports to simulate the mounting of the driveline 10 in the motor vehicle (not shown). By simulating the mounting arrangement of the driveline 10 to the motor vehicle, the present invention more accurately predicts the driveline dynamics in the vehicle.

Most drivelines 10 for a rear wheel vehicle comprise a two-piece driveshaft 16 having a center bearing 18 support and an axle 20 supported by an independent suspension 22. A fixture 12 to support such a driveline 10 design will be described in the present application. One skilled in the art will recognize other driveline configurations may be balanced using the method and fixture taught herein using minor modifications without departing from the scope of the invention, an example of which includes a single-piece driveshaft 16 without a center bearing 18.

In the preferred embodiment, a driveline 10 includes a front driveshaft 11 which is supported and driven by the motor 14 of the fixture 12. The front driveshaft 11 is drivably connected to a rear driveshaft 13 through a universal joint 24. The driveshafts 11, 13 are further supported by a center bearing 18 assembly. The center bearing 18 is clamped in vehicle position to a support 30 in the fixture 12 which supports the center bearing 18 and the driveline 10. The rear driveshaft 13 is connected to a rear axle 20 through a differential 26 as is known in the art and supported thereby. The differential 26 drives a pair of independently suspended rear halfshafts 28, 29. The rear axle 20 is supported by a variety of suspension 22 components as is known in the art. The above-mentioned suspension 22 components are ultimately mounted to the body of the motor vehicle (not shown), and the fixture 12 of the preferred embodiment includes supports 35 which have provisions to mount the suspension 22 components at their attachment point to the vehicle and thereby support the axle 20 to simulate mounting the axle 20 to the body of the motor vehicle.

Figure 2:
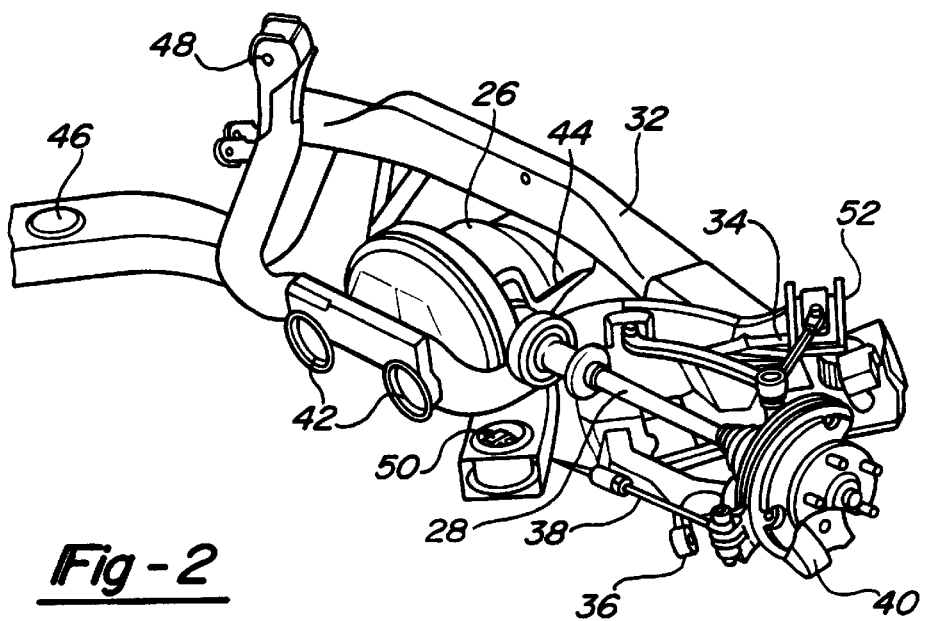
FIG. 2 is a perspective view of a differential supported in a manner according to the present invention.

The suspension 22, as shown in FIG. 2, is supported in the preferred embodiment as follows. A subframe 32 is provided which supports upper and lower control arms 34, 36. The control arms 34, 36 and toe link 38 support a knuckle 40 which supports a bearing (not shown) which supports the outboard end of the halfshaft 11. The inboard end of the halfshaft is supported by the differential 26, as is well known in the art. The subframe 32 further supports the differential 26 at the rear 42 and side 44 of the differential 26. The subframe 32 is subsequently attached to the body (not shown) at several locations 46, 48, 50, 52. These locations 46, 48, 50, 52 are used by the fixture to support the subframe 32 so the driveline 10 is supported as in the motor vehicle.

As shown in FIG. 1, a flexible coupling 54 is preferably provided on the front of the front driveshaft 11. As is known in the art, the flexible coupling 54 includes six circumferentially spaced holes provided on the coupling 54 to bolt the driveshaft 11 to the transmission (not shown). The motor 14 of the fixture 12 of the preferred embodiment has a shaft 56 extending therefrom with a flange 58 provided at the distal end. The flange 58 includes a plurality of pins (not shown) to drivably engage the flexible coupling 54 of the front driveshaft 11. The pins (not shown) engage the holes on the coupling 54 and support the front of the driveshaft 11 and drivably engage the coupling 54. A cylinder (not shown) is preferably mounted between the motor 14 and the flexible coupling 54 to permit retraction and engagement of the pins (not shown) with the flexible coupling 54. The drive motor 14 is mounted on a slide 60 so a variety of driveshaft 16 lengths may be accommodated in one fixture 12.

In a preferred embodiment, the front driveshaft 11 further includes a pilot hole (not shown) in the front of the driveshaft at the centerline of the longitudinal axis 62 of the driveshaft 11. This pilot hole is engaged by a pin (not shown) provided on the shaft 56 of the fixture 12 to ensure proper alignment of the front of the driveshaft 11 to the drive motor 14.

The center bearing 18 is supported by the fixture on a support 30 on the fixture 12 located in vehicle position. The bearing 18 is clamped to the support 30. A universal joint 24 is provided between the front driveshaft 11 and rear driveshaft 13 as is well known in the art. A second flexible coupling 74 is provided between the driveshaft 13 and differential 26. This coupling 74, like the front coupling 54, includes a plurality of circumferentially spaced bolts 72 and nuts 73 to secure the coupling 74 to the driveshaft 13 and differential 26.

The fixture 12 includes additional supports 35 to support the rear suspension 22 of the motor vehicle. The supports 35 correspond with the mounting points 46, 48, 50, 52 for the subframe 32 to the body. The subframe 32 is clamped to the fixture 12 to support the suspension 22 and driveline 10 to the fixture 12. The fixture 12 thus supports the driveline 10 in vehicle position as if the driveline 10 were mounted in the motor vehicle.

In our co-pending application 08/676,761, filed Jul. 8, 1996, incorporated herein by reference, as the motor 14 rotates the driveline 10 in the fixture 12, vibration of the driveline 10 are measured at the interface between the driveshaft 16 and the rear differential 26. The apparatus of the '761 application preferably senses with a sensor clamped directly to the case of the differential 26 adjacent the differential input shaft 68.

In a preferred embodiment of the present invention, the driveline vibrations are sensed by sensors 47, 49, 51, 53 provided at the mounting locations 46, 48, 50, 52 of the subframe 32 to the body. These sensors 47, 49, 51, 53 thus measure the vibrations experienced through the subframe 32 and felt by the vehicle. In a preferred embodiment, one sensor is used and imbalances are corrected based on the data obtained therefrom. Alternatively, a plurality of sensors are provided as illustrated herein. The position of the sensor is determined through testing and is application specific.

The sensors 47, 49, 51, 53 are preferably provided on the fixture 12 and are in contact with the subframe 32 near or at one or more of the body mounting positions 46, 48, 50, 52. Alternatively, sensors could be clipped to the subframe in a manner similar to that described for the differential case in the '761 application.

The sensors 47, 49, 51, 53 preferably comprise a moving coil sensor commercially available from Schenck Turner. Alternatively, the detection means 64 comprises non-contacting probes (not shown) described in the '049 patent to Kopp. The non-contacting probes measure vibrations experienced through the subframe 32. During rotation of the driveline 10, the magnitude and orientation of any imbalance in the assembly at the rear end of the driveshaft 13 is thus measured by the sensors 47, 49, 51, 53 and indicated to the operator by the fixture 12. The operator adds a weight 76 to the rear driveshaft 13 assembly to correct the imbalance.

The fixture 12 includes a calculator, preferably a computer 78, which in response to the signal generated by the sensors 47, 49, 51, 53, uses an algorithm to calculate how much weight is to be added and at which rotational position the weight is to be added. Preferably, the computer 78 also calculates to which one or more of the bolts 72 the weight is to be added to offset the imbalance. The weights 76 preferably comprise threaded nuts 76 which are threaded to the bolts 72, the nuts 76 having known incremental weights selectable by the operator.

The nuts 76 preferably weigh from approximately 1 gram to approximately 8 grams having 1 gram increments therebetween. Other known methods of balancing, although not illustrated here, may be used, including adding a weight to the driveshaft 13 by welding or using an adhesively secured weight. Furthermore, the weighted nuts described above may alternatively comprise a weighted push-on nut, a J-clip, or any other weight added to the fasteners of the flexible coupling or added to the driveshaft 13 or flexible coupling 74 itself.

The fixture 12 measures the rotational orientation of the driveline 10 or the motor 14, thereby imputing the orientation of the driveline 10 using means known in the art. Thus, as the driveline 10 rotates and an imbalance is measured, the fixture 12 is able to establish a position, as described in the '049 patent, 180 degrees from the detected imbalance to add a weight 76 to the driveline 10.

Figure 3:
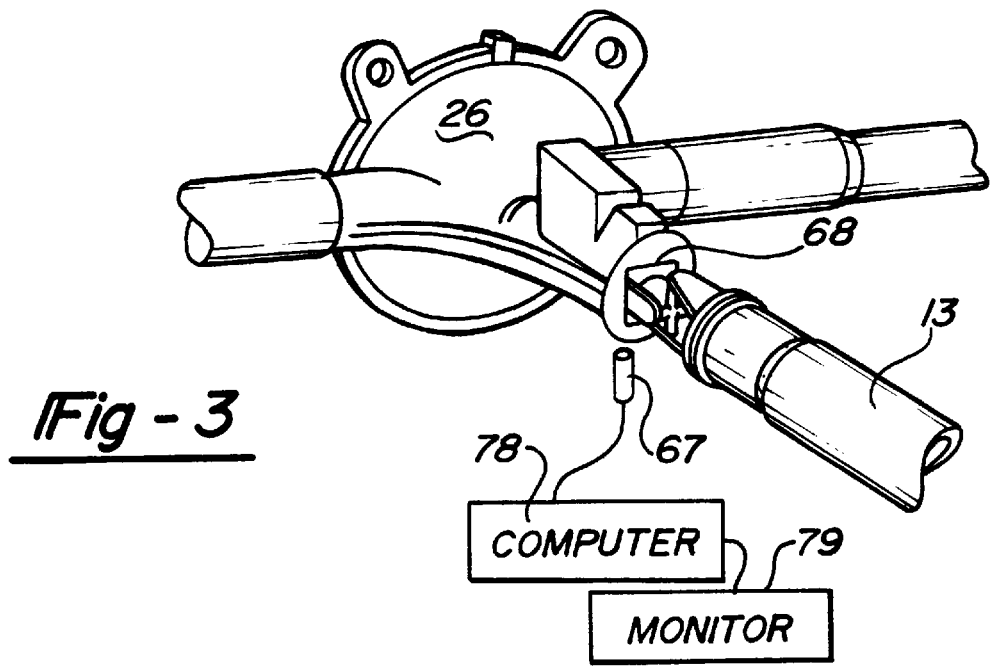
FIG. 3 is a perspective view of a sensor mounted to a differential for measuring imbalance according to the present invention.
Figure 4:
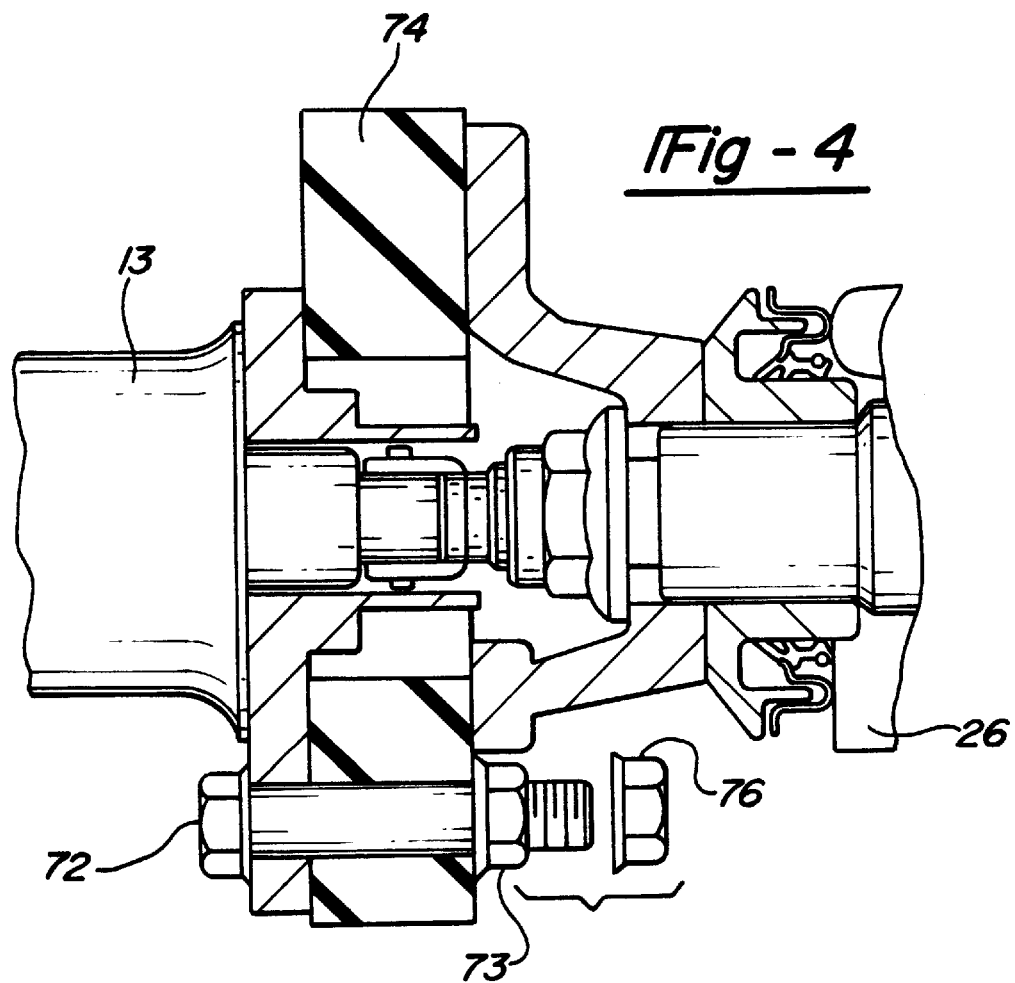
FIG. 4 is a side elevation of a flexible coupling according to the present invention.

Preferably, the fixture includes a sensor 67, such as a proximity sensor, to determine the orientation of the bolts 72, as shown in FIG. 3, provided on the rear coupling 74, which secure the driveshaft 13 to the differential 26. Thus, the fixture 12 may coordinate the placement of weighted nuts 76 on one or more of the coupling bolts 72 opposite the measured imbalance to correct any imbalance. Because of the orientation of the bolts 72 and size of weights 76 available, it may be necessary to mount a second weight (not shown) on a second bolt (not shown) adjacent the first bolt 76 opposite the imbalance. A third weight (not shown) may be required at the rotational position imbalance to offset the weight of the added balancing nuts 76 if the weight thereof exceeds the measured imbalance by an unacceptable amount, thereby creating an unacceptable imbalance at a new position.

The fixture preferably includes a monitor 79 which displays the size of the weight to be added. Alternatively, a plurality of bins, one for each size of weight, may be provided with a light above each bin. The light above the proper bin is illuminated to indicate the proper weight to be added.

In the preferred embodiment, the drive motor 14 drives the driveline 10 at approximately 3000 rpm, as determined by vehicle testing. The motor 14 speed may vary depending on the vehicle being tested and the drivetrain 10 provided therein. Alternatively, the optimal rotational speed for a particular driveline 10 is determined using the methods taught in U.S. Pat. No. 5,431,049 to Kopp ('049), assigned to the assignee of the present invention. The teachings of the '049 patent are incorporated herein by reference.

Preferably, the fixture 12 indexes the driveshaft 13 to the correct rotational orientation to place the bolt 72 on which the operator is to install a specified weight 76 at a convenient location for the operator to install the weight 76. The fixture also displays, or automatically provides, the proper weight 76 which the operator is to add and thereby minimize weighting errors by the operator. The fixture has a calibratible acceptance limit, such that if the magnitude of the vibration does not exceed a predetermined amount, the operator is instructed to not add any additional weight. Alternatively, the operation of adding the balance weights may be automated, so that the machine automatically selects a proper weight 76 and secures the weight 76 to the driveline 10.

The fixture 12 further includes rubber isolators 37 between the base 15 of the fixture 12 and the mounting supports 33, 30, 35 for the motor 14, center bearing 18, and rear suspension 22, illustrated in FIG. 1 at one position only. The isolators thus prevent most vibrations produced by the fixture 12 or the environment from being transmitted through the mounts to the driveline 10. Therefore, these vibrations are not improperly detected by the sensors 47, 49, 51, 53 as a driveline imbalance.

In an alternative embodiment of the present invention, the driveline 10 imbalance is measured after the driveline 10 in installed into the motor vehicle (not shown). In this embodiment, the vehicle is driven, preferably on rolls which maintain the vehicle in a stationary position, while a sensor 47, 49, 51, 53 is mounted to the subframe 32 as described above. A second sensor 67 detects the rotational orientation of the driveline 10 to determine the angular position of the imbalance as described above. When the imbalance is detected, the operator is instructed to add weight 76 to one or more bolts 72 on the flexible coupling 74 between the driveshaft 13 and the differential 26, as described above.

Additional sensors (not shown) may be provided on the fixture 12 to measure other driveline 10 noise, such as gearing noise and imbalances other than those described above. Such sensors are mounted on the supports 30, 33, 35 in the fixture 12 which simulate the vehicle body mounting positions for attachments to the vehicle. The information obtained from these sensors may be used to determine whether the noise, vibration and harshness (NVH) characteristics of that particular driveline are acceptable. Preferably, these sensors are accelerometers, commercially available from Schenck Turner. An unacceptable driveline 10 is rejected prior to installation in the vehicle and further diagnosis may be required to establish where the source of the noise originates.

In the preferred embodiment, a synchronizer device 80 is provided to synchronize the rotational speed of the halfshafts of the rear axle. The synchronizer 80 is provided on the fixture 12 and is driven by the rear axle 20. The synchronizer 80 preferably includes a pair of shafts 81, 82 rotatably supported by the fixture 12. Each shaft 81, 82 is drivably connected to the brake rotor 83, 84 on one of the halfshafts 28, 29 of the axle 20, respectively. Each shaft 81, 82 is moveable axially to engage and release the halfshafts 28, 29. The first shaft 81 drives a belt 85 which is drivably attached to one end of a spindle 87. The second shaft 82 drives a second belt 86 which is drivably attached to the second end of the spindle 87. Thus, the axle 20 drives both shafts 81, 82, which in turn drive the belts 85, 86 to rotate the synchronizer spindle 87. The synchronizer 80 thereby overcomes the differential effect of the rear axle 20 and causes the halfshafts 28, 29 to rotate at the same speed, simulating driving on a straight road.

Although the preferred embodiments of the present invention have been disclosed, various changes in modifications maybe made without departing from the scope of the invention as set forth in the appended claims.

What is claimed is:

1. An apparatus for balancing a driveline assembly of a motor vehicle, the driveline assembly including a driveshaft drivingly engaged with an axle assembly, the apparatus comprising:

a driveshaft support for rotatably supporting the driveshaft;

a motor for rotating a combined assembly of the driveshaft and axle assembly;

a plurality of axle mounting supports for supporting the axle assembly, each of said axle mounting supports supporting the axle assembly at an attachment on the axle assembly where the axle assembly is mounted to the motor vehicle;

a vibration sensor for measuring vibrations generated by the driveshaft and axle assembly at one of said mounting supports while the driveshaft is rotated and for generating signals in response thereto;

an imbalance calculator for receiving the signals from said sensor and determining a size and position for a balance weight to be secured to the driveshaft to rotatably balance the driveline assembly; and an indicator for displaying the balance weight to be secured to the driveshaft.

2. The balancing apparatus defined in claim 1, wherein the axle assembly comprises a subframe for supporting the axle assembly and the vibration sensor measures a driveline imbalance based on vibrations of the subframe.

3. The balancing apparatus defined in claim 2, wherein the driveline assembly further comprises a coupling provided between the driveshaft and axle assembly, and the coupling comprises a plurality of bolts circumferentially spaced to connect the coupling to the driveshaft, and the apparatus further comprises a means for determining the rotational position of one of said bolts relative to the detected imbalance.

4. The balancing apparatus defined in claim 3, wherein the driveshaft support comprises a center support for supporting a center bearing for supporting the driveshaft in vehicle position, and the motor is connected to a first end of the driveshaft.

5. The balancing apparatus of claim 4, wherein the axle assembly further comprises a pair of halfshafts drivably connected to a differential and an independent rear suspension supporting the halfshafts to the subframe for attachment to the motor vehicle, and the axle mounting supports support the axle assembly by attachment to the subframe.

6. The balancing apparatus defined in claim 5, wherein the halfshafts are each driven at an independent rotational speed, and the apparatus further comprises a synchronizing means for synchronizing the speed of the halfshafts.

7. A method for balancing a combined assembly of a driveshaft having a center bearing and an axle assembly including a differential housed in a case, the balancing method comprising the steps of:

drivably connecting the driveshaft to the axle assembly through a coupling;

supporting the driveshaft in vehicle position on a fixture;

supporting the axle assembly in vehicle position in the fixture using a plurality of axle assembly attachments for mounting the axle assembly to a motor vehicle;

rotating the combined assembly; and sensing vibrations at the axle assembly attachments to the motor vehicle.

8. The method as defined in claim 7, further comprising supporting the axle assembly with a subframe and measuring vibrations of the subframe.

9. The method of balancing the combined assembly as defined in claim 8, further comprising the step of securing a weight to the coupling to balance the combined assembly.

10. The method of balancing the combined assembly as defined in claim 9, wherein the weight comprises a weight secured to a bolt on the coupling.

11. The method of balancing the combined assembly as defined in claim 10, further comprising synchronizing a output speed at either end of the axle assembly.

12. A method for balancing a combined assembly of a driveshaft having a center bearing and an axle assembly including a differential housed in a case, the balancing method comprising the steps of:

drivably connecting the driveshaft to the axle assembly through a flexible coupling;

supporting the driveshaft in vehicle position;

supporting the axle assembly in vehicle position through a subframe;

rotating the combined assembly;

sensing vibrations at the subframe by mounting a sensor thereto; and securing a weight to the coupling to balance the combined assembly.

* * * * *